June 5, 1962  A. B. BLACKBURN  3,037,559
AIR DRIVEN TURBINE

Filed Aug. 13, 1959  4 Sheets-Sheet 1

INVENTOR.
Alan B. Blackburn
BY
W. E. Finken
HIS ATTORNEY

June 5, 1962    A. B. BLACKBURN    3,037,559
AIR DRIVEN TURBINE
Filed Aug. 13, 1959    4 Sheets-Sheet 3
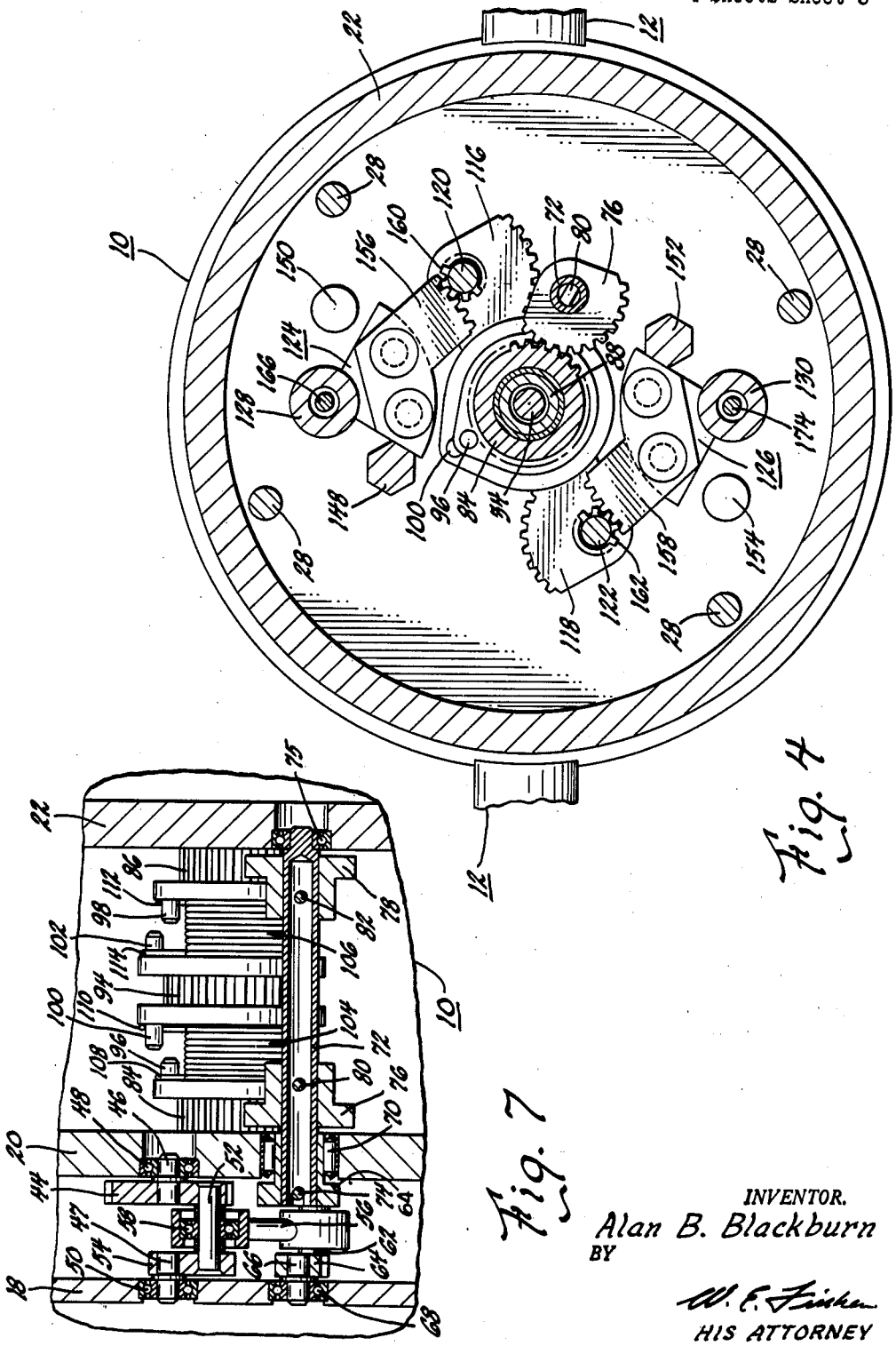
INVENTOR.
Alan B. Blackburn
BY
W. E. Fisher
HIS ATTORNEY

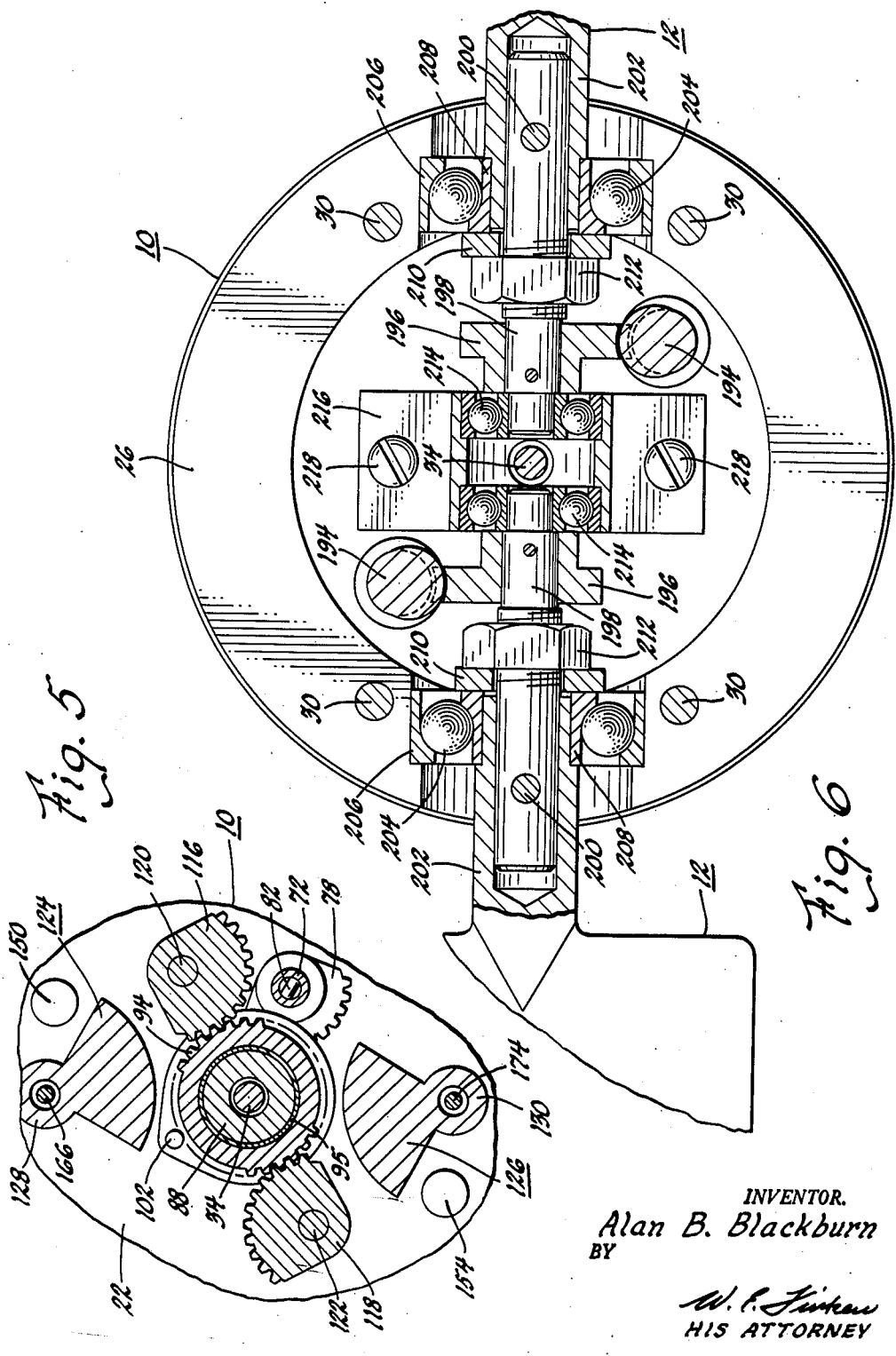

United States Patent Office 3,037,559
Patented June 5, 1962

3,037,559
AIR DRIVEN TURBINE
Alan B. Blackburn, Troy, Ohio, assignor to General Motors Corporation, Detroit, Mich., a corporation of Delaware
Filed Aug. 13, 1959, Ser. No. 833,612
15 Claims. (Cl. 170—68)

This invention pertains to air driven turbines and particularly to a variable pitch air driven turbine including isochronous governing means for maintaining turbine speed substantially constant.

In my earlier application Serial No. 787,692, filed January 19, 1959, an air driven turbine having a roller type isochronous governor is disclosed. A roller type governor is well adapted for turbine installations having high governing speed and requiring a relatively low torque to adjust the pitch position of the turbine blades. The present invention relates to a clutch-type isochronous governor for particular application in large air driven turbines which require high torque to adjust the pitch position of the blades.

Accordingly, among my objects are the provision of an isochronous governor for a variable pitch air driven turbine; the further provision of isochronous governing means having a relatively high output torque and designed for use with large air driven turbines; the further provision of isochronous governing means of the aforesaid type including means for adjusting the speed setting thereof; and the still further provision of a clutch-type isochronous governor for a variable pitch air driven turbine including jitter means.

The aforementioned and other objects are accomplished in the present invention by utilizing a pair of one-way coil spring clutches to impart pitch adjusting movement to the turbine blades in opposite directions under the control of a flyweight governor. Specifically, in the disclosed embodiment, the pitch position of the blades is cyclically varied about a mean pitch position during on speed conditions. This cyclical pitch variation eliminates the static friction dead band and may be termed jitter means. During off speed conditions, the pitch position of the blades is automatically adjusted by the flyweight governor so as to maintain turbine speed substantially constant at the selected speed setting.

Further objects and advantages of the present invention will be apparent from the following description, reference being had to the accompanying drawings, wherein a preferred embodiment of the present invention is clearly shown.

In the drawings:

FIGURE 4 is a sectional view taken along line 4—4 of FIGURE 2.

FIGURE 5 is a fragmentary sectional view taken along line 5—5 of FIGURE 2.

FIGURE 6 is a fragmentary view, partly in section and partly in elevation, taken along line 6—6 of FIGURE 2.

FIGURE 7 is a fragmentary sectional view, partly in section and partly in elevation, taken along line 7—7 of FIGURE 3.

Figure 3:
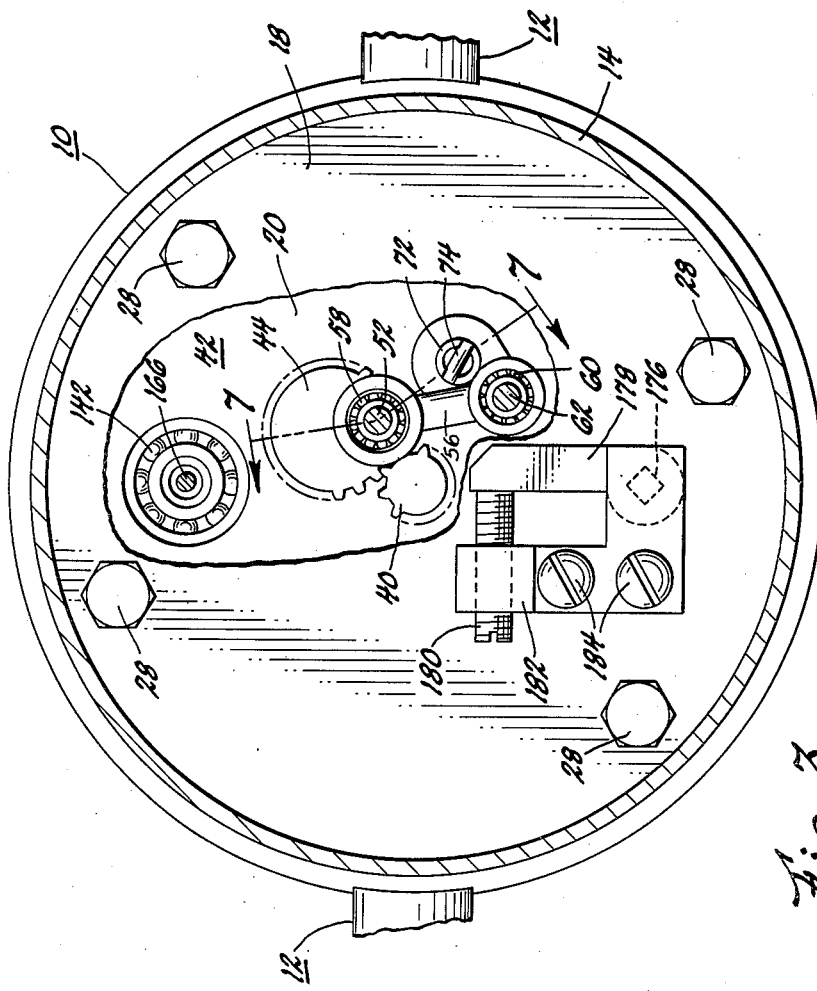
FIGURE 3 is a sectional view with certain parts broken away taken along line 3—3 of FIGURE 2.
Figure 1:
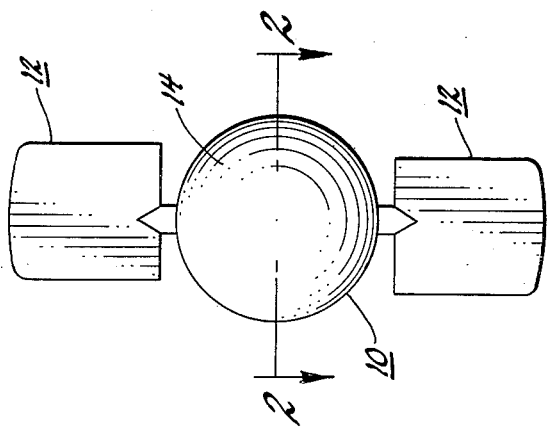
FIGURE 1 is a front view in elevation of an air driven turbine constructed according to the present invention.

With particular reference to FIGURES 1 and 3, an air driven turbine is shown including a hub 10 having a pair of diametrically opposed blades 12 journalled therein for rotation about their longitudinal axes throughout a range of pitch positions from a substantially flat pitch position to a substantially full feathered pitch position. The front end of the hub 10 is closed by a spinner shell 14 of any suitable configuration which is attached to the hub by screw devices 16. The hub 10 comprises five sections 18, 20, 22, 24 and 26. The sections 18, 20, 22 and 24 are interconnected by bolts indicated by numeral 28. The section 26 is likewise connected by bolts 30 to the section 24 as seen in FIGURE 6, the heads of the latter bolts being recessed within the hub section 26. In addition, the hub section 26 is keyed or otherwise suitably connected to an output shaft 32 which can be connected to any suitable accessory, such as a generator or a pump, not shown.

Figure 2:
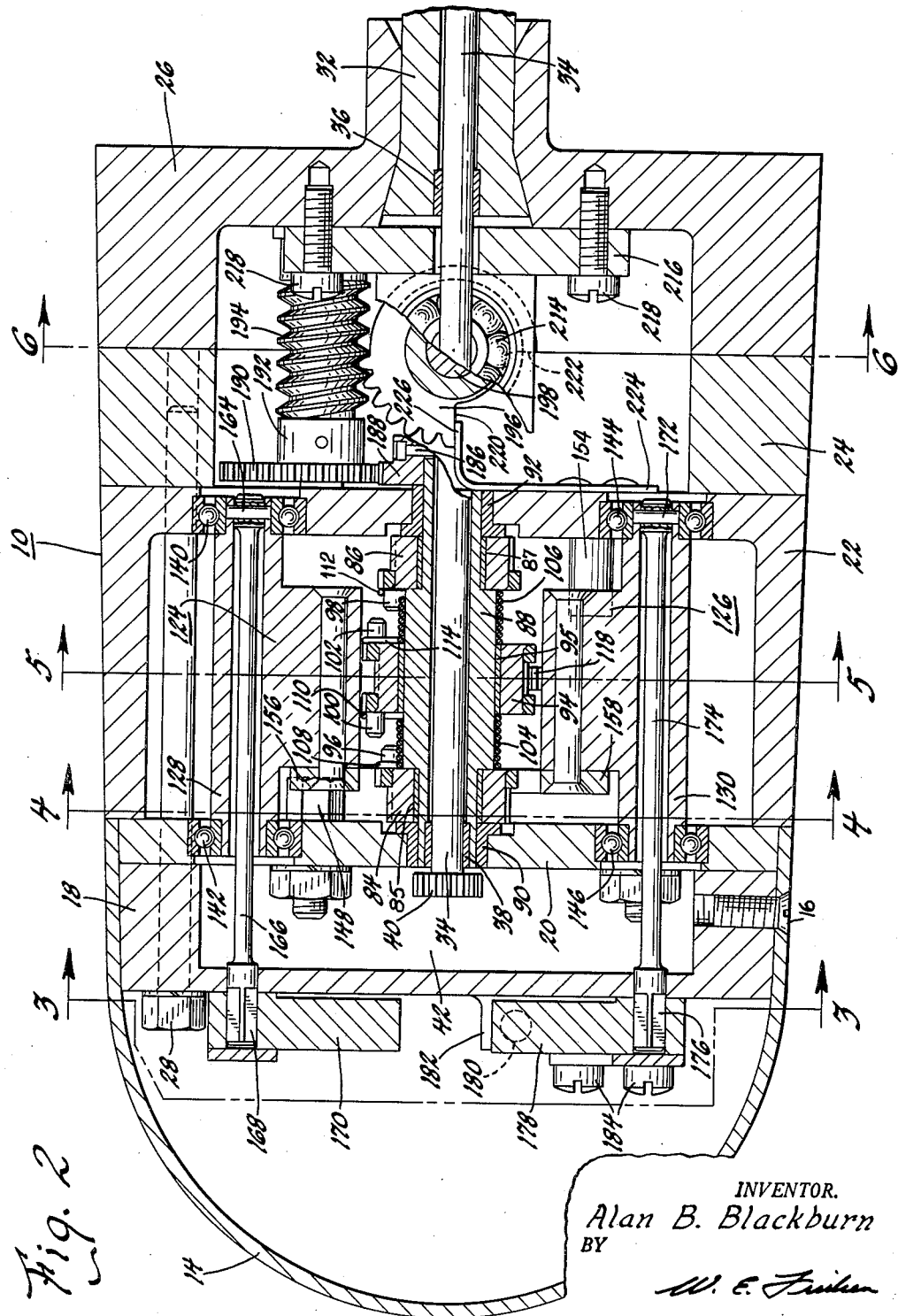
FIGURE 2 is an enlarged fragmentary view, partly in section and partly in elevation, taken generally along the line 2—2 of FIGURE 1.

The output shaft 32 is hollow, as seen in FIGURE 2, and rotates about a fixed shaft 34 coaxial with the shaft 32 and extending therethrough. The rotatable output shaft 32 is journalled for rotation relative to the shaft 34 by a sleeve bearing 36, and the hub section 20 is journalled for rotation relative to the fixed shaft 34 by a sleeve bearing 38. The fixed shaft 34 has a gear 40 attached thereto at its aft end, the gear 40 being located within a chamber 42 formed between the hub sections 18 and 20. As seen in FIGURES 3 and 7, a gear 44 meshes with the gear 40. The gear 44 is attached to a stub shaft 46, and the pitch diameter of gear 44 is twice that of gear 40. Thus, during each revolution of the hub, the gear 44 will be rotated 180° about its axis. The gear 44 carries an eccentrically located crank pin 52, one end of which is attached to the gear 44 and the other end of which is attached to a crank arm 54 attached to the stub shaft 47. The stub shafts 46 and 47 are journalled by ball bearings 48 and 50, respectively in hub sections 20 and 18. One end of a connecting rod 56 is journalled on the crank pin 52 by ball bearing 58, the other end of the connecting rod 56 being journalled by ball bearing 60 on a crank pin 62. The crank pin 62 is attached to and extends between a two part crank arm 64, one part of which is attached to a stub shaft 66 journalled by a ball bearing 68 in the hub section 18. The other part of the crank arm 64 is journalled by needle bearing 70 in the hub section 20, and is attached to an oscillating shaft 72 by means of a cross pin 74.

Since the gear 40 is stationary during rotation of the hub 10 about the shaft 34, the gear 44 will be rotated and through the crank pin 52 and connecting rod 56 will impart oscillation to the crank 64. The crank 64 will in turn oscillate the oscillating shaft 72, and in the disclosed embodiment the amplitude of oscillation imparted to the oscillating shaft 72 is substantially 90°. A complete oscillatory stroke of 90° is imparted to the oscillating shaft for every two revolutions of the hub. The oscillating shaft 72 is journalled at its opposite end by ball bearing means 75 in the hub section 22, and has a pair of sector gears 76 and 78 connected thereto by cross pins 80 and 82, respectively. The sector gears 76 and 78 mesh with oscillating gears 84 and 86, respectively.

With reference to FIGURE 2, the oscillating gears 84 and 86 are supported for rotation relative to a hollow governor shaft 88, coaxial with the fixed shaft 34, by sleeve bearings 85 and 87. One end of the hollow governor shaft 88 is supported for rotation relative to the hub section 20 by a sleeve bearing 90, and the other end of the governor shaft is supported for rotation relative to the hub section 22 by a sleeve bearing 92. A control gear 94 is supported on the governor shaft 88 between its ends by sleeve bearing 95. The oscillating gears 84 and 86 carry abutment means in the form of axially extending pins 96 and 98, respectively, and the control gear 94 carries a pair of pins 100 and 102. A coil spring clutch 104 is disposed between the oscillating gear 84 and the control gear 94 and a coil spring clutch 106 is disposed between the control gear 94 and the oscillating gear 86. Each of the coil spring clutches includes a plurality of closely wound convolutions frictionally engaging the governor shaft 88 and outwardly extending end portions. One end portion 108 of the coil spring 104 engages the pin 96, and the other end portion 110 thereof engages the pin 100. Similarly, one end turn portion 112 of the spring clutch 106 engages the pin 98 and the other end turn portion 114 thereof engages the pin 102. The end portions of the coil spring clutches are looped over the pins such that during oscillation of the oscillating gears 84 and 86 in the clockwise direction as viewed in FIGURE 4, the coil spring clutch 104 will be engaged, and the clutch 106 disengaged, and during oscillation of the oscillating gears 84 and 86 in the counterclockwise direction, as viewed in FIGURE 4, the coil spring clutch 106 will be engaged and the clutch 104 disengaged.

With reference to FIGURE 5, the control gear 94 meshes with a pair of sector gears 116 and 118 which are attached to flyweight counter shafts 120 and 122, respectively. The flyweight counter shafts 120 and 122 are journalled by suitable bearing means, not shown, in the hub sections 20 and 22. Since the hub 10 rotates about the fixed shaft 34, the shafts 120 and 122 rotate therewith and the sector gears 116 and 118 carried thereby will impart rotation to the control gear 94. Likewise, shaft 72 rotates with the hub 10, and the sector gears 76 and 78 carried thereby will impart rotation to the oscillating gears 84 and 86. Thus, the oscillating gears 84 and 86 and the control gear 94 will rotate in the same direction and at the same speed as the hub during rotation thereof.

As seen in FIGURES 2 and 4, a pair of diametrically opposed centrifugally responsive flyweights 124 and 126 are supported for angular movement between the hub sections 20 and 22. The flyweights 124 and 126 are integral with hollow shafts 128 and 130, respectively, journalled by ball bearings 140, 142, 144 and 146, respectively, in hub sections 22 and 20. The flyweights 124 and 126 are movable by centrifugal force throughout an angle of substantially 10° as determined by stops 148 and 150 for the flyweight 124 and stops 152 and 154 for the flyweight 126. The stops 148 and 150 comprise the heads of bolts attached to the hub section 20 which project rearwardly therefrom. The stops 150 and 154 are formed by pins press fitted into the rear wall of hub section 22 which extend forwardly therefrom. The flyweight 124 has a sector gear segment 156 riveted thereto, and the flyweight 126 has a sector gear segment 158 riveted thereto. The sector gear segments 156 and 158 mesh with pinions 160 and 162, respectively, integral with the flyweight counter shafts 120 and 122. The gear ratio between the flyweights and the control gear 94 is such that a 10° movement of the flyweights moves the gear 94 through an angle of 90°.

As seen particularly in FIGURE 2, the flyweight 124 is connected by a pin 164 with a torsion bar 166 coaxial with the shaft 128 and extending therethrough. The torsion bar 166 is formed with a substantially rectangular end portion 168 which is received in a complementary socket of a crank arm 170. Similarly, the flyweight 126 is connected by a pin 172 to a torsion bar 174. The torsion bar 174 has a rectangular end portion 176 disposed within a socket of a crank arm 178. As seen in FIGURE 3, the crank arm 178 is engaged by the end of a set screw 180 which threadedly engages an L-shaped bracket 182 attached to the hub section 18 by bolts 184. The crank arm 170 is likewise adjustably mounted on the hub section 18. The preload on the torsion bars 166 and 174 can be adjusted by the set screws, such as indicated by numeral 180, and the set screws thus constitute means for adjusting the speed setting of the governor. The torsion bars 166 and 174 resist outward pivotal movement of the flyweights 124 and 126 respectively, under the urge of centrifugal force.

With reference to FIGURES 2 and 6, the governing shaft 88 is connected by a pin 186 to a master gear 188. A pair of blade gears, one of which is depicted by numeral 190, mesh with the master gear 188. Since the blade gears 190 rotate with the hub, the master gear 188 and the governor shaft also rotate with the hub. Each blade gear is pinned to a shaft 192 having an irreversible worm 194. The shafts 192 are journalled for rotation in the hub sections 22 and 26. The irreversible worms 194 mesh with worm wheel sectors 196 attached to stub shafts 198. The stub shafts 198 are connected by pins 200 to the hollow root portions 202 of the turbine blades 12. The root portions 202 of the turbine blades are journalled for rotation relative to the hub 10 by ball bearings 204. The outer races 206 of the bearings 204 engage shoulders of the hub, and the inner races 208 are confined between a shoulder on the blade roots and a thrust collar 210 held in position by a nut 212 which threadedly engages the stub shaft 198.

The stub shafts 198 carrying the worm wheel sectors 196 are supported by ball bearings 214, the outer races of which are carried by a plate 216 attached to the hub section 26 by bolts 218. As seen in FIGURE 2, each worm gear sector 196 has an arcuate cutout defining abrupt shoulders 220 and 222 located substantially 90° apart. A leaf spring stop 224 attached to the hub section 22 has an end portion 226 disposed within the arcuate cutout and constitutes a stop means limiting pitch adjusting movement of the blades 12. In the position shown in FIGURE 2, the blades are at a substantially flat pitch position wherein the end 226 engages the shoulder 220. When the blades are at the full feathered position, the end 226 engages the shoulder 222. If the governor should call for a pitch change when the blades are at either of their limit positions, namely a flat pitch position or the feathered pitch position, the worm gear sector 196 will be disengaged from the worm 194 thereby deflecting the end 226 of the leaf spring 224 which will react to reengage the worm gear sector and the worm gear when the worm 194 is driven in the opposite direction.

*Operation*

The isochronous governing mechanism of this invention operates as follows. When the hub is positioned in a moving air stream, rotation will be imparted to the hub 10 in the counterclockwise direction as viewed in FIGURE 1. Rotation of the hub 10 about the fixed shaft 34 will through the sector gears 116 and 118, and the sector gears 76 and 78 impart counterclockwise rotation to the control gear 94 and the oscillating gears 84 and 86 in the counterclockwise direction at hub speed. Since the master gear 188 is drivingly connected to the governor shaft 88 and the blade gears 190, the master gear 188 and the governor shaft 88 will likewise be driven in the counterclockwise direction at hub speed. If there is no relative movement between the master gear 188 and the blade gears 190, blades 12 will remain at a substantially constant pitch position.

However, inasmuch as the oscillating shaft 72 is oscillated back and forth throughout an angle of 90° during each two revolutions of the hub, the oscillating gears 84 and 86 will likewise be oscillated back and forth throughout an angle of 90° relative to the governor shaft 88. During oscillation of the gears 84 and 86 in the clockwise direction relative to the governor shaft 88, as seen in FIGURE 4, the coil spring clutch 104 will be engaged so as to impart clockwise movement to the governor shaft 88 relative to the hub. At the same time the clutch 106 will be unwound and will spring load the flyweights. During counterclockwise oscillation of the oscillating gears 84 and 86, as seen in FIGURE 4, the coil spring clutch 106 will be engaged so as to impart counterclockwise movement to the governor shaft 88 relative to the hub. At this time the clutch 104 will be unwound and will spring load the flyweights. The gear ratio between the governor shaft 88 and the blade 12 is selected to give the proper maximum rate of pitch change for the maximum off speed. By alternating spring loading the flyweights, the static friction deadband is substantially eliminated.

When the speed of turbine rotation exceeds the speed setting of the governor means, the flyweights 124 and 126 move outwardly toward the stops 150 and 154, respectively. This outward movement of the flyweights which will impart clockwise angular movement to the sector gears 116 and 118, and these sector gears 116 and 118 will in turn drive the control gear 94 in the counterclockwise direction as viewed in FIGURE 5. With the control gear 94 displaced in the counterclockwise direction, during oscillation of the oscillating gears 84 and 86, the coil spring clutch 104 will be engaged for a longer interval than will the coil spring clutch 106. Accordingly, there will be a net differential rotation of the governor shaft 88 and the master gear 188 in the clockwise direction, and this differential clockwise movement between the master gear 188 and the blade gears 190 will rotate the worm gear sectors 196 and the blades 12 so as to increase the pitch positions thereof. The torque required to adjust the pitch position of the blades is derived from the oscillating gear train. Since by increasing the pitch position of the blades 12, a smaller angle attack is presented to the air stream, the speed of the turbine will decrease.

Conversely, when the speed of the turbine is less than the speed setting of the governor, the flyweights 124 and 126 will move toward the stops 148 and 152, respectively thereby imparting counterclockwise rotation to the sector gears 116 and 118. The sector gears will turn the control gear 94 in the clockwise direction as viewed in FIGURE 5, so that coil spring clutch 106 will be engaged for longer intervals than coil spring clutch 104. This will result in a net movement of the governor shaft 88 and the master gear 188 in a counterclockwise direction relative to the hub so as to decrease the pitch position of the blades. When the pitch position of the blades is decreased, a larger angle attack of the airfoil section thereof is exposed to the air stream thereby increasing the speed of turbine rotation.

While the embodiment of this invention as herein disclosed constitutes a preferred form, it is to be understood that other forms might be adopted.

What is claimed is as follows:

1. An air driven turbine including, a hub, a blade journalled in said hub for pitch adjustment and operable to impart rotation thereto when positioned in an air stream, a stationary member disposed within said hub and about which said hub rotates, oscillatory means carried by said hub and supported for rotation relative thereto having a driving connection with said stationary member so as to be oscillated relative to said hub during rotation thereof, a shaft carried by said hub and drivingly connected to said blade such that differential rotation between said shaft and said hub will adjust the pitch position of said blade, a pair of clutches operatively interconnecting said oscillatory means and said shaft for imparting rotation to said shaft relative to said hub in opposite directions, and centrifugally actuated governor means rotatable with the hub and operatively connected with said clutches for determining the interval of engagement of each of said clutches whereby the pitch position of said blade will be adjusted to maintain turbine speed substantially constant.

2. An air driven turbine including, a hub, a blade journalled in said hub for pitch adjustment and operable to impart rotation thereto when positioned in an air stream, a stationary member disposed within said hub and about which said hub rotates, an element carried by said hub and supported for rotation relative thereto having driving engagement with said stationary member so as to be rotated relative to said hub during rotation of said hub about said stationary member, oscillatory means carried by said hub and operatively connected to said element so as to be oscillated by rotation of the element relative to the hub, a pair of coil spring clutches operatively connected to said oscillatory means, a shaft carried by said hub and supported for rotation relative thereto, drive means connecting the shaft and said blade for adjusting the pitch position thereof upon rotation of said shaft relative to said hub, said coil spring clutches engaging said shaft for imparting rotation thereto in opposite directions during oscillation of said oscillatory means, and centrifugally actuated governor means carried by said hub and operatively connected with said clutches for controlling the interval of operation of each clutch to maintain turbine speed substantially constant through adjustment of the pitch position of said blade.

3. An air driven turbine including, a hub, a blade journalled in said hub for pitch adjustment and operable to impart rotation thereto when positioned in an air stream, a stationary member disposed within said hub and about which said hub rotates, a shaft carried by said hub and supported for rotation relative thereto, means interconnecting said shaft and said blade for adjusting the pitch thereof upon relative movement between said shaft and said hub, a pair of one-way clutches operable to drivingly interconnect said shaft and said stationary member to impart rotation to said shaft relative to said hub in opposite directions, and centrifugally actuated governor means carried by said hub and operable to control said clutches to maintain the speed of turbine substantially constant by varying the pitch position of said blade.

4. An air driven turbine including, a hub, a blade journalled in said hub for pitch adjustment and operable to impart rotation thereto when positioned in an air stream, a stationary member disposed within said hub and about which said hub rotates, pitch adjusting means carried by said hub for rotation relative thereto and connected to said blade such that rotation of said pitch adjusting means relative to said hub will adjust the pitch position of said blade, a pair of one-way clutches operable to interconnect said pitch adjusting means and said stationary member so as to impart rotation in opposite directions to said pitch adjustment means relative to said hub during rotation thereof, and centrifugally actuated governor means rotatable with the hub and operable to control the operation of said clutches so as to maintain turbine speed substantially constant by adjusting the pitch position of said blade.

5. An air driven turbine including, a hub, a blade journalled in said hub for pitch adjustment and operable to impart rotation thereto when positioned in an air stream, a stationary shaft about which said hub rotates, a stationary gear attached to said stationary shaft and disposed within said hub, a gear rotatable with said hub and supported for rotation relative to said hub having driving engagement with said stationary gear so as to be rotated relative to said hub during rotation thereof, an oscillatory shaft carried by said hub and supported for rotation relative thereto, means interconnecting said oscillatory shaft and said rotatable gear for imparting oscillation to said oscillatory shaft upon rotation of said hub, pitch adjusting means carried by said hub and rotatable relative thereto, means interconnecting said pitch adjusting means and said blade for adjusting the pitch position of said blades during rotation of said pitch adjusting means relative to said hub, clutch means operable to interconnect said oscillatory shaft and said pitch adjusting means to impart rotation to said pitch adjusting means in opposite directions relative to said hub, and centrifugally actuated governor means operable to control operation of said clutch means to maintain turbine speed substantially constant by adjusting the pitch position of said blade.

6. An air driven turbine including, a hub, a blade journalled in said hub for pitch adjustment and operable to impart rotation thereto when positioned in an air stream, a stationary shaft about which said hub rotates, a gear attached to said shaft and disposed within said hub, a gear carried by said hub and supported for rotation relative thereto having engagement with said stationary gear, a first shaft carried by said hub and supported for rotation relative thereto, means interconnecting said first shaft and said rotatable gear for imparting oscillation to said first shaft during rotation of said hub, a second shaft carried by said hub and supported for rotation relative thereto, means interconnecting the second shaft and said blade for adjusting the pitch position thereof during rotation of the second shaft relative to the hub, clutch means operative to drivingly connect said first and second shafts so as to impart rotation to said second shaft in opposite directions relative to said hub, and centrifugally actuated governor means operatively connected with said clutch means for controlling the operation thereof so as to maintain turbine speed substantially constant by adjusting the pitch position of said blade.

7. The air driven turbine set forth in claim 6 wherein the means interconnecting said rotatable gear and said first shaft comprises a crank pin on said rotatable gear, a crank arm on said first shaft and a connecting rod having its opposite ends movably connected to said crank pin and said crank arm.

8. The air driven turbine set forth in claim 6 wherein said second shaft is coaxial with said stationary shaft.

9. The air driven turbine set forth in claim 6 wherein said clutch means comprise a pair of coil spring clutches.

10. The air driven turbine set forth in claim 9 including a pair of oscillating gears supported on said second shaft for rotation relative thereto, a control gear journalled on said second shaft between said oscillating gears, and means interconnecting the oscillating gears and said first shaft, one end turn of each coil spring clutch engaging abutment means on one of said oscillating gears, and the other end turn of each coil spring clutch engaging abutment means on said control gear.

11. The air driven turbine set forth in claim 6 wherein said centrifugally actuated governor means comprises a pair of flyweights supported for pivotal movement relative to said hub and a pair of torsion bars operatively connected to the said flyweights and said hub for opposing movement of said flyweights due to the thrust of centrifugal force.

12. The air driven turbine set forth in claim 11 including means for adjusting the preload on said torsion bars to vary the speed setting of said governor means.

13. An air driven turbine including, a hub, a blade journalled in said hub for pitch adjustment and operable to impart rotation thereto when positioned in an air stream, pitch adjusting means deriving torque from rotation of said hub for adjusting the pitch position of said blade, isochronous governing means driven by said hub and operable to control said pitch adjusting means so as to maintain the turbine speed substantially constant, and oscillating means driven by said hub and operable to actuate the pitch adjusting means to effect cyclic pitch adjustment of the blade about a mean pitch position when the turbine is rotating at the speed setting of the governing means.

14. An air driven turbine including, a hub, a blade journalled on said hub for pitch adjustment and operable to impart rotation thereto when positioned in an air stream, pitch adjusting means for said blade deriving torque from rotation of said hub including a shaft carried by the hub and rotatable relative thereto and means interconnecting said shaft and said blade operable to adjust the pitch position of said blade upon rotation of said shaft relative to said hub, isochronous governing means driven by said hub and operable to control the rotation of said shaft relative to said hub whereby the pitch of said blade will be adjusted so as to maintain turbine speed substantially constant, and oscillating means operable continuously during rotation of said hub for imparting oscillatory movement to said shaft to effect cyclic pitch adjustment of the blade about a mean pitch position when the turbine is rotating at the speed setting of the governor means.

15. An air driven turbine including, a hub, a blade journalled in the hub for pitch adjustment and operable to impart rotation thereto when positioned in an air stream, pitch adjusting means for said blade deriving torque from rotation of said hub including a shaft carried by and supported for rotation relative thereto and means interconnecting said shaft and said blade for adjusting the pitch position of said blade upon rotation of said shaft relative to said hub, a stationary member about which said hub rotates, oscillatory means carried by said hub and drivingly connected to said stationary member so as to be oscillated during rotation of said hub, a pair of clutches drivingly connecting said oscillatory means and said shaft for imparting oscillatory movement to said shaft in both directions relative to said hub to effect cyclic pitch adjustment of the blade about a mean pitch position during rotation of said hub, and centrifugally actuated governing means operable to control said clutches in accordance with the speed of rotation of said turbine so as to maintain turbine speed substantially constant by adjusting the pitch of said blade.

References Cited in the file of this patent

UNITED STATES PATENTS

| | | |
|---|---|---|
| 772,052 | Perry | Oct. 11, 1904 |
| 1,443,664 | Vischer | Jan. 30, 1923 |
| 2,685,932 | Hartel | Aug. 10, 1954 |
| 2,874,787 | Battenberg et al. | Feb. 24, 1959 |